United States Patent [19]

Knijpstra

[11] Patent Number: 4,735,545
[45] Date of Patent: Apr. 5, 1988

[54] BOAT CRADLE

[75] Inventor: Hette Knijpstra, Terband, Netherlands

[73] Assignee: Knijpstra Konstruktie B.V., Terband, Netherlands

[21] Appl. No.: 892,431

[22] Filed: Aug. 4, 1986

[30] Foreign Application Priority Data

Aug. 6, 1985 [NL] Netherlands ............................ 8502195

[51] Int. Cl.$^4$ ............................ B60P 3/10; B63C 5/02
[52] U.S. Cl. .................................... 414/474; 414/485; 414/498
[58] Field of Search ................ 414/474, 475, 476, 483, 414/485, 495, 499, 498, 500

[56] References Cited

U.S. PATENT DOCUMENTS

| | | |
|---|---|---|
| 2,750,058 | 6/1956 | Burch . |
| 2,917,194 | 12/1959 | Streater .............................. 414/500 |
| 2,987,203 | 6/1961 | Funk, Jr. ............................. 414/476 |
| 3,032,218 | 5/1962 | Grigonis ............................. 414/476 |
| 3,578,190 | 5/1971 | May ................................. 414/500 X |
| 4,155,667 | 5/1979 | Ebsen ................................. 405/7 |
| 4,449,846 | 5/1984 | Price .................................. 405/7 |
| 4,522,550 | 6/1985 | Whitehouse ....................... 414/498 |

FOREIGN PATENT DOCUMENTS

| | | |
|---|---|---|
| 63651 | 11/1982 | European Pat. Off. . |
| 1453288 | 9/1966 | France . |
| 8005665 | 5/1982 | Netherlands . |
| 2092529 | 8/1982 | United Kingdom ................... 405/7 |

Primary Examiner—Kenneth J. Dorner
Assistant Examiner—Peter R. Brown
Attorney, Agent, or Firm—Murray and Whisenhunt

[57] ABSTRACT

A boat cradle for supporting boats, comprising a frame supported on legs and carrying support arms of adjustable length that extend upwards from said frame. According to the invention, the frame is supported on three leg structures.

14 Claims, 2 Drawing Sheets

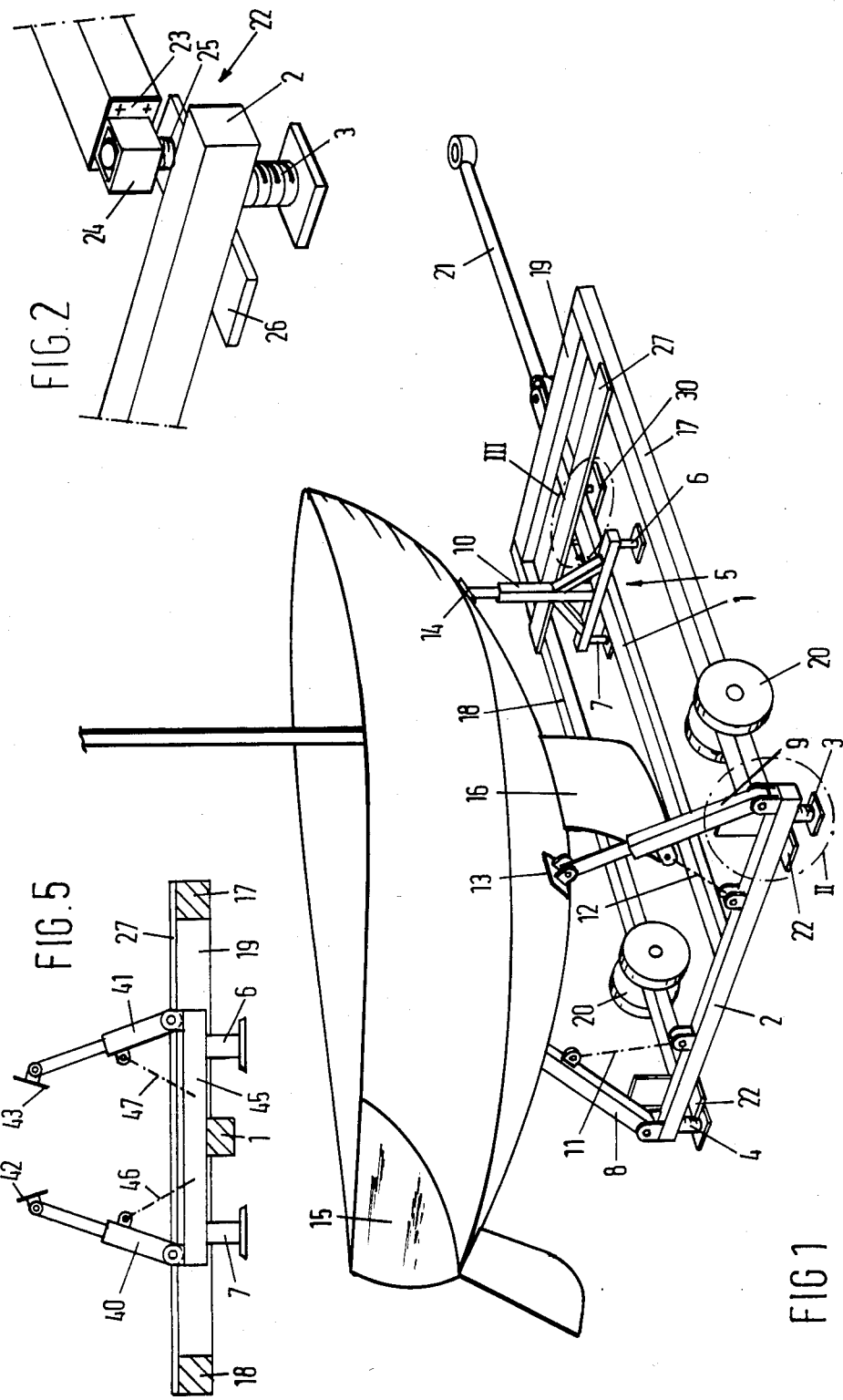

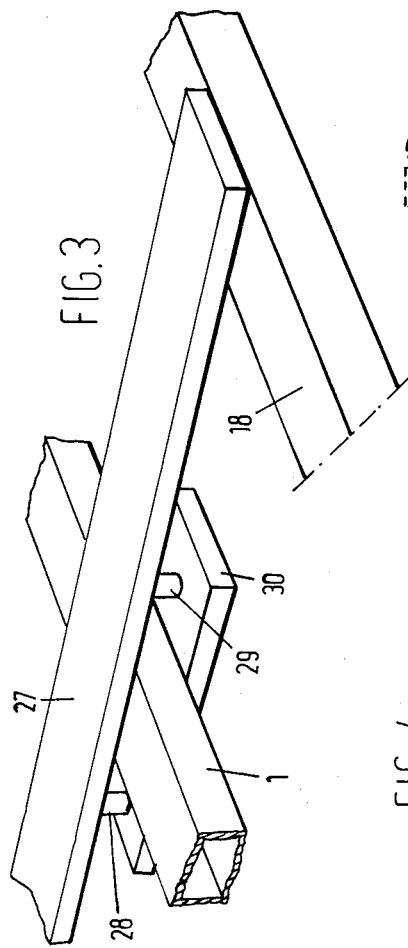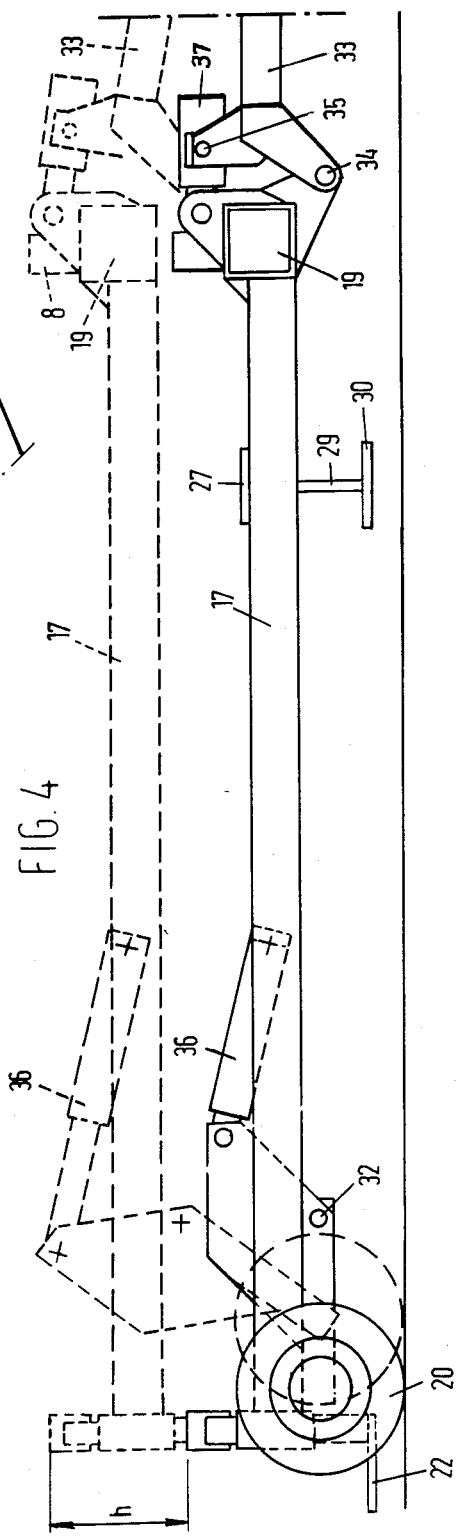

BOAT CRADLE

This invention relates to a cradle for supporting boats, comprising a frame supported on legs and carrying support arms of adjustable length that extend upwards from said frame. The invention also relates to a combination of the cradle described and a known per se trailer with a U-shaped chassis.

Boat cradles of the above type are generally known and are used for the storage, repair and the like of boats on dry land. Hitherto such cradles have always been equipped with a frame supported on four legs. Such four-point frames have the disadvantage that they hardly ever ensure stable positioning of the cradle with a boat placed on it. Placed on soggy soil, nearly always one of the four legs will tend to sink away, resulting in instability of the cradle. This can be prevented by placing the cradle on a hardened substrate. This, however, involves considerable expense, in particular also because such a hardened substrate should be absolutely planar, lest the cradle is yet unstable because of one of the legs failing to touch the non-planar substrate.

Another disadvantage of prior cradles is that a hoisting tool is always required in removing a boat from the water or lifting a boat from a trailer and placing such boat on the cradle. A special, and particularly extensive transport tool is needed for moving the cradle.

It is therefore an object of the present invention to provide a cradle and a combination of cradle and trailer, by which the above drawbacks and disadvantages are overcome.

For this purpose, according to the invention, the cradle frame is supported on three leg structures. Such a construction is always stable, even on non-planar substrates or on soggy soils, so long as the centre of gravity of boat and frame is not too far beyond the centre of gravity of the frame. This latter requirement will mostly be met in the case of keeled boats, because the keel, the heaviest part of the boat, greatly lowers the centre of gravity.

According to another feature of the invention, there is provided a combination of a known per se trailer having a U-shaped chassis and a cradle according to the invention, with the trailer including carrying members for carrying the cradle. In this case, the trailer can be placed so that the U-shaped chassis is positioned to embrace the longitudinal girder of the cradle, and the cradle can be moved by the trailer by being engaged by the carrying members. Owing to this construction of trailer and cradle, a special transport tool is no longer required, but the available trailer will suffice.

Preferably, the U-shaped chassis of the trailer is adjustable in height, relatively to the bottom, as disclosed, for that matter, in Netherlands patent application No. 8005665. The advantage of a combination of a cradle according to the invention and such a trailer is that a boat can be removed from the water via a slipway without a hoisting tool, raised with the trailer, and rolled over the cradle to be subsequently lowered on to the latter. When the cradle must additionally be moved, it can be brought into engagement with the carrying members of the trailer, whereafter the trailer chassis can be raised somewhat, so that the trailer is lifted clear from the ground and can be moved by the trailer.

Some embodiments of the invention will now be described by way of example, with reference to the accompanying drawings. In said drawings, FIG. 1 shows a perspective view of a cradle according to the present invention with a boat supported thereon, carried by a U-shaped trailer;

FIG. 2 shows a perspective view of a detail of a carrying member attached to an end of a trailer leg;

FIG. 3 is a perspective view, showing a detail of a carrying member, attached under a cross-beam of the trailer;

FIG. 4 is a side view of an otherwise known U-shaped trailer of adjustable height, shown in two positions and FIG. 5 shows a part-sectional elevation of a divided forward carrying arm.

FIG. 1 shows a cradle according to the present invention with a T-shaped frame or substructure. The substructure consists of a longitudinal girder 1 and a crossbeam 2. The substructure rests on the ground with three legs structures, namely, two legs 3, 4 under the ends of the crossbeam and a leg structure 5, including two closely-spaced legs 6,7 under the longitudinal girder 1. In this way the substructure is supported in a stable manner, by means of a three-point support on a substrate which may or may not be plane or hardened. Mounted on the substructure are carrying arms 8,9,10 of adjustable length. Arms 8,9, mounted on the ends of crossbeam 2 of the cradle, are pivotable about a longitudinal horizontal axis. These arms can be fixed in an angular position by means of push rods 11,12, which are of adjustable length. A third carrying arm 10 is attached to the end of the longitudinal girder 1. The carrying arms are further provided with boat supporting members at their ends. The support members 13 of carrying arms 8,9 are of substantially planar configuration and pivoted relatively to the carrying arms. Carrying arms 8,9 may be interconnected by a support strap, attached to the ends of the carrying arms, so that the hull is supported throughout the entire width at this point. The support member 14 of the carrying arm on the longitudinal girder, on the other hand, is of cup-shaped configuration. Resting on carrying arms 8,9,10 and support members 13,14 is a boat 15. If necessary, the boat can be fixed on the cradle by straps or the like. The keel 16 of boat 15 is supported on the longitudinal girder 1. If necessary or desirable, suitable means can be provided on the longitudinal girder to support the keel. The keel of a vessel is always the heaviest part. As, in this embodiment, the keel is supported, the hull is prevented from being excessively loaded, which may result in the skin being torn, but in addition the keel is prevented from bumping against obstacles during transport across, for example, uneven terrain, which could damage the keel.

The cradle is carried by a known per se U-shaped trailer having legs 17,18, cross-beam 19, wheels 20 and draw-hook 21. The trailer is provided with some particular elements for it to be able to carry the cradle. Attached to the rear end of the legs of the trailer are carrying members 22. This carrying member 22, shown in detail in FIG. 2, comprises a tube member 24, secured to the trailer leg by means of a flange plate 23. Accommodated within tube member 24 is a second tube member 25, so as to be movable, but also fixable therein. Secured to the bottom end of the second tube member is a horizontal rearwardly extending flat plate 26 on which the cross beam 2 of the cradle is supported. As the carrying members are provided on the rear end of the legs of the trailer, any cradle of any given width can be received. The cradle also does not need to fit within the width of the trailer and the cradle width can be adapted to, in particular, broad beamed boats for optimum stability.

Provided on the trailer is a second cross-beam 27. Mounted under this cross-beam is a carrying structure comprising two depending rods 28,29 and a flat plate 30 secured between the ends of the rod. The same can be achieved, for that matter, by means of a chain. The end of the longitudinal girder 1 of the cradle can be moved between rods 28,29 to be supported on the flat plate, as shown in more detail in FIG. 3. In this way, the cradle is fully supported on the trailer, and can be moved by means of it.

To provide a universal trailer which, in addition to the three-point cradle according to the present invention is also capable of carrying 4-point or like cradles used in the prior art, additional provisions can be made on the trailer such as, for example, a carrying cross-beam at the front of the trailer between and under the longitudinal girder. Also, the carrying members for the three-point cradle, described hereinbefore, can be made adjustable so as to be capable of carrying a four-point cradle as well. For this purpose, for example, tube member 25 could be mounted in tube member 24 so as to be rotatable about a vertical axis.

Preferably, the trailer is additionally adjustable in height. A similar trailer, disclosed in Netherlands patent application No. 8005665 is shown in FIG. 4. The longitudinal girders 17 forming the legs of the trailer are interconnected by cross-beam 19. The legs 17 are further supported by wheels 20 suspended from connecting arms 32, which are pivotally attached to the legs. These arms 32, like the draw pole 33 of the trailer, via transmission 34,35, are adjustable in position relative to the chassis by means of hydraulic cylinder 36,37, so that the trailer can be adjusted to different heights as described in Netherlands patent application No. 8005665. This adjustment in height will also vary the height of carrying members 27, 29,30 and 22. This enables a boat to be removed from the water by means of the trailer in a simple manner and to be moved to a given height by means of the hydraulic adjusting mechanisms. The trailer can then be moved to embrace the T-shaped substructure of the cradle so that the boat comes to hang over the cradle. Advantageously, in this connection, the forward carrying arm 10 on the longitudinal girder of the cradle is collapsible or removable so that the keel can move above and over the longitudinal girder. When the boat is correctly positioned, the carrying arm can again be moved into its desired position, whereafter the boat can be lowered onto the cradle by lowering the trailer. The cradle with the boat supported by it can then, or if necessary later on, be moved by placing the trailer about the cradle in the correct manner, bringing carrying members 22, 27 and 30 into engagement with the cross-beam and longitudinal girder of the cradle and again adjusting the trailer in height to lift the cradle clear from the ground. The use of the cradle in combination with the height-adjustable trailer is in addition advantageous in moving the cradle across uneven terrain, for example a deeply tracked road. In such a case, the cradle would be apt to become stuck, but can remain clear from the bottom by adjusting the height of the trailer.

It will be clear that the invention is not limited to the embodiments described but that many modifications are possible without departing from the scope of the invention. Thus, for example, the forward carrying arm (FIG. 5) may be divided into two separate carrying arms 40,41, provided at their free ends with support member 42, 43, respectively, of substantially planar configuration and pivotally secured to arms 40,41. Arms 40,41 are pivoted to a cross-beam 45 supported by legs 6,7 and can be fixed in an angular position by push rods 46,47 of adjustable length. Arms 40 and 41 are also of adjustable length. Owing to these features the forward carrying arms 40,41, as well as the rear carrying arms 8,9 can be optimally adjusted to the specific contours of the hull of the boat being carried. Such modifications are deemed to fall within the scope of the present invention.

What I claim:

1. A cradle for supporting a boat while being transported by a trailer or while being stored, comprising:
   (1) a frame having a cross-beam and a girder affixed thereto, which girder extends substantially laterally and perpendicularly from the cross-beam;
   (2) three support arms for supporting the boat on the said frame in a position such that the hull of the boat is spaced from and above the frame but such that the keel of the boat may rest on the said girder, wherein the three support arms are adjustable in length and two of the arms are fixed to the cross beam near the ends thereof and secured in selected positions by adjustable push rods connected between the arms and the cross-beam so that the two arms are angularly adjustable, and wherein one of the arms is supported by the girder and is collapsible or removable, and wherein the said two arms fixed to the cross-beam are pivotably fixed to the cross beam so as to provide a continuum of selectable angles between the said two arms and the cross-beam for positioning the said two arms in juxtaposition to opposite sides of the hull of the boat near the stern thereof; and
   (3) two cross-beam support legs extending downwardly from the cross-beam and disposed near each end thereof for supporting the said cross-beam from a surface upon which the frame rests and one girder support means extending downwardly from the girder and being connected to the said support arm, said girder support means having two closely adjacent leg members for contacting the surface upon which the frame rests, with a leg member being on either side of the girder.

2. The cradle of claim 1, wherein means are provided for supporting the keel of the boat on the said girder.

3. The cradle of claim 1, wherein the said two support arms have adjustable support members on the free ends thereof.

4. The cradle of claim 1, wherein the said two support arms have a strap attached to the free ends thereof for supporting the boat hull near the stern thereof.

5. The cradle of claim 1, wherein the two leg members are so closely adjacent that the frame is supported on the surface upon which it rests at essentially only at three points.

6. The cradle of claim 1, wherein the frame is supported upon the surface upon which the frame rests at essentially only three points, whereby the cradle can be supported by a surface which is non-planar or soggy.

7. The cradle of claim 1, wherein the said one support arm has at its free end a cup-shaped support member for receiving the boat near the bow and centerline thereof.

8. A trailer and cradle combination for supporting and transporting a boat, comprising:

(1) a trailer having a generally U-shaped frame and having:
   (a) a trailer cross beam;
   (b) two trailer legs attached near the ends of the trailer cross beam and extending substantially laterally and perpendicularly therefrom;
   (c) a substantially horizontally disposed trailer support plate attached to each of the free ends of the said legs; and
   (d) wheels attached to said legs;
(2) a cradle having a generally T-shaped frame and having:
   (a) a cradle cross-beam;
   (b) a cradle girder attached to said cradle cross-beam and extending generally laterally and perpendicularly therefrom;
   (c) three support arms which are adjustable in length, with two of the said arms being pivotably fixed to said cradle cross-beam near opposite ends thereof such that a continuum of selectable angles are provided between the said two arms and the cradle cross-beam, and one of which arms is supported by said cardle girder, whereby the said arms are positionable such that a boat hull being supported by said cradle is spaced from and above the said cradle but such that the keel may rest on the said girder; and
   (d) three downwardly extending cradle support means for supporting the same frame from a surface upon which the cradle rests, two of which cradle support means are in the form of legs which are attached to said cradle cross beam near opposite ends thereof and one of which cradle support means is connected to and positionable with the one support arm supported by said girder and said one support means is in the form of two closely adjacent leg members for contacting the surface upon which the frame rests, with a leg member being on either side of the said girder;

and wherein the cradle cross-beam is engageable by and supportable by the said trailer support plates and the cradle girder is engageable by and supportable by the said trailer cross-beam, whereby the said trailer is releasably engageable with the said cradle such that the trailer may be moved into engagement with the cradle, the trailer and cradle are moveable together to a selected location and the trailer is removable from the cradle such that the cradle is self-supporting on a support surface.

9. The combination of claim 8, wherein means are provided for supporting the keel of the boat on the said girder.

10. The combination of claim 8, wherein the said two cradle support arms have adjustable support members on the free ends thereof.

11. The combination of claim 8, wherein the said two cradle support arms have a strap attached to the free ends thereof for supporting the boat hull near the stern thereof.

12. The combination of claim 8, wherein the two leg members are so closely adjacent that the frame is supported on the surface upon which it rests at essentially only at three points.

13. The combination of claim 8, wherein the said one cradle support arm has at its free end a cup-shaped support member for receiving the boat near the bow and centerline thereof.

14. The combination of claim 12, wherein the cradle frame is supported upon the surface upon which the frame rests at essentially only three points, whereby the cradle can be supported by a surface which is non-planar or soggy.

* * * * *